350-377 SR SEARCH ROOM
XR 3,525,870
CROSS REFERENCE

Aug. 25, 1970 R. E. MacDONALD ET AL 3,525,870

MAGNETIC MEMORY HAVING POLARIZED STATE DETECTOR

Filed Nov. 9, 1967

INVENTORS.
RONALD E. MAC DONALD
C. DENIS MEE
OTTO VOEGELI
BY Gerald L. Moore
ATTORNEY

3525870
OR IN 250/568

United States Patent Office 3,525,870
Patented Aug. 25, 1970

3,525,870
MAGNETIC MEMORY HAVING POLARIZED STATE DETECTOR

Ronald E. MacDonald, San Jose, and Charles Denis Mee, Los Gatos, Calif., and Otto Voegeli, West Lafayette, Ind., assignors to International Business Machines Corporation, Armonk, N.Y., a corporation of New York
Filed Nov. 9, 1967, Ser. No. 681,671
Int. Cl. G06k 7/10
U.S. Cl. 250—219 7 Claims

ABSTRACT OF THE DISCLOSURE

A detector for sensing the change in the state of a light beam caused by passage through a magneto optical memory element having discrete areas magnetized indicative of data desired to be stored.

CROSS-REFERENCES TO RELATED APPLICATIONS

This invention relates to a detector for use with such data storage systems as that described in the U.S. application 593,387, Mee et al., filed on Nov. 10, 1966 and entitled "Beam Addressable Memory System" and assigned to the same assignee as the present application.

BACKGROUND OF THE INVENTION

Field of the invention

The invention relates to detectors for sensing a change effected on a beam of light caused by directing the beam onto a magnetic element, which element exhibits magneto optical properties which affect intercepted light in response to the direction of magnetization of the element.

Description of the prior art

Memory systems using magneto optical materials which are able to assume a specific magnetic alignment in discrete areas indicative of data are widely known. One manner of recording such information involves the heating of discrete areas of the material in a magnetic field. The heating lowers the coercive force of the material in the discrete area and the magnetization of that area switches into the direction of the biasing field. Since the coercive force of adjacent areas is unchanged, only the heated area is switched.

The information can be read by exposing the discrete area to a light beam which is either transmitted or reflected by the memory element. Depending upon the direction of magnetization of the area interacting with the beam, light of one polarized sense will be passed from the element more readily than that of another polarized sense depending upon the magnetized state of the element. By detecting the resulting change in light intensity, the direction of magnetization of the discrete areas of the element can be sensed for reading the information stored thereon.

In the past, the change in the light intensity caused by the memory element has been detected directly for reading the magnetization state of the discrete areas of the memory element. However, experience has shown that the change in the intensity of the light is small in comparison to the original intensity of the light, thereby resulting in a low signal-to-noise ratio for the outgoing signal. Thus, it is difficult to read rapidly the information on such memory elements with the high degree of accuracy necessary in data storage systems.

It is, therefore, the primary object of this invention to provide an improved readout system for detecting data stored on magneto optical type memory elements.

A further object of this invention is to provide a detector which senses the magnetic alignment of a magneto optical memory element and gives a signal having a high signal-to-noise ratio.

The foregoing and other objects, features and advantages of the invention will be apparent from the following more particular description of a preferred embodiment of the invention, as illustrated in the accompanying drawings.

SUMMARY OF THE INVENTION

Figures 1, 2:
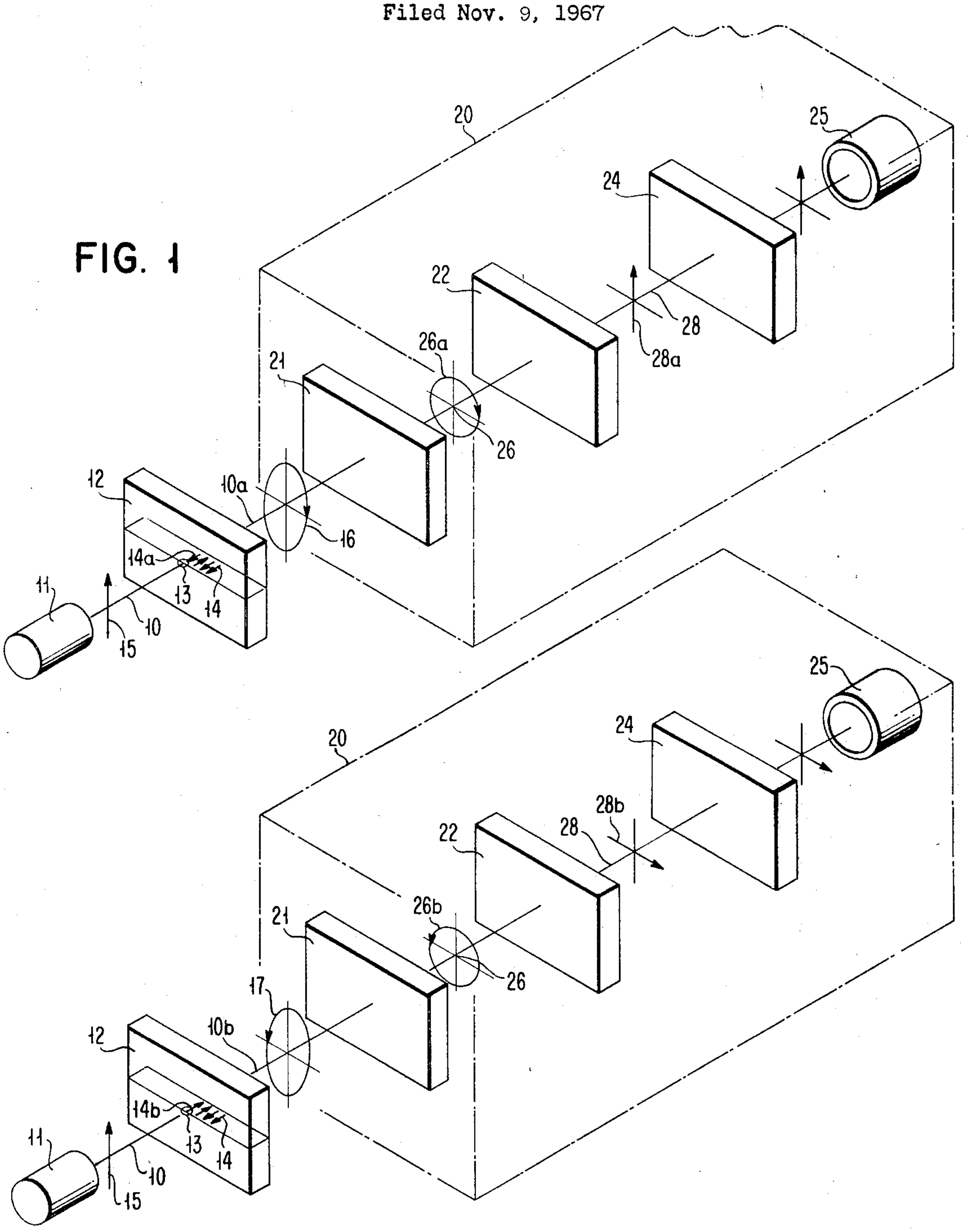
FIG. 1 shows the detector and the state of the light within, wherein such detector is being used to sense the alignment of a discrete area of a memory element magnetized in one direction.
FIG. 2 shows the detector and the state of the light passing therethrough resulting when the element is magnetized in the opposite direction.

A detector for sensing the change effected on a beam of plane polarized light by exposure to a magneto optical memory element comprising the combination of a compensator for rendering the light circularly polarized of a polarity indicative of the magnetic alignment of the element, a linear retarder for changing the circularly polarized light to a linearly polarized state having a direction of polarization indicative of the direction of polarization of the circularly polarized light, an analyzer for receiving the light and for transmitting only that part having a direction of polarization in one direction, and a detector for sensing and generating a signal responsive to the presence or absence of light thereby indicating the magnetic state of the element intercepting the light beam.

DESCRIPTION OF A PREFERRED EMBODIMENT OF THE INVENTION

As shown in the drawings, the invention is described as being used to detect a change in a polarized light beam 10 originating at a light source 11. In the example illustrated, the light beam is directed generally normal to the surface of a memory element 12 made of a material such as a garnet exhibiting magneto optical properties. During recording, discrete areas 13 of the memory element are aligned magnetically as shown by the arrow 14 to indicate digital information bits which can be detected by passing a polarized light beam through the memory element and detecting a change. The recording methods are well known in the technology field.

The light beam 10 is plain polarized as indicated by the arrow 15, and is transmitted through the memory element in a manner determined in this instance by the circular dichroic properties of the memory element material. By detecting a change in the polarization state of the light, the magnetic alignment of the discrete area 13 through which the beam is transmitted can be sensed for reading the information stored on the memory element. Thus, the beam 10 in being plane polarized is composed of right and left circularly polarized light components being of equal intensity and having an in-phase alignment. Due to the circular dichroic properties of the memory element material, one or the other of the circular polarized components is preferentially absorbed responsive to the magnetic alignment of the area through which the beam is passed. That is, by the example shown in FIG. 1, with the magnetic alignment being that indicated by the arrow **14*a*, the beam 10 after transmission through the memory element will be right elliptically polarized as indicated by the graphic representation 16. Additionally (as shown in FIG. 2), if the discrete area through which the beam 10 has passed is magnetized in the direction represented by the arrow 14*b*, the beam 10*b* after passage therethrough will be left elliptically polarized as indicated graphically by the ellipse 17**. Therefore, it should be understood that the beam transmitted through the memory element will be either left or right elliptically polarized, depending upon the direction of magnetization of the memory element through which the beam is passed.

In the past, the ellipticity of the beams **10*a* and 10*b*** usually has been detected by separating the beam into the right and left circularly polarized components and comparing the intensity of these components to determine which has been absorbed the greater amount. The signal-to-noise ratios obtainable by such a detecting scheme are quite low since the change in intensity of either of these components is quite small in comparison to the total intensity of the beam of light.

In accordance with the present invention, a detector for sensing the change effected on a plane polarized light beam by a magneto optical material is provided comprising the combination of a compensator, a linear retarder and an analyzer for receiving the light beam serially, followed by a photoelectric transducer. The detector functions to eliminate the average component of the instant light passing through the memory element and thereafter to detect optically the phase of the light for indicating the magnetic alignment of the memory element through which the light has passed. Thus, as shown in the drawings, a detector 20 is provided comprising a compensator 21, a linear retarder 22 and an analyzer 24 positioned in that order to receive the light beam after it has passed through the memory element 12. The photoelectric transducer 25 then detects the presence or absence of light passing through the beforementioned components for generating an electric signal indicating the magnetic alignment of the discrete areas of the memory element through which the beam is passing.

As previously described, the beam **10*a* or 10*b* resulting after passage of the beam 10 through the memory element exhibiting circular dichroic properties will be elliptically polarized in one of the two directions indicated by the elliptical representations 16 and 17. This beam, on entering the detector 20, is passed through a compensator 21 which functions to change the beam to a circular polarization preferably by absorbing a portion thereof not absorbed by the memory element. The beam now is circularly polarized in the right or left hand direction as indicated by the beams 26*a* and 26*b*, with the direction of polarization being dependent upon the direction of magnetization of the memory element. The beam then is passed into the linear retarder 22 (commonly called a quarter-wave plate). Such plates are well known and serve to change the polarization of the beam to a linearly polarized state. The direction of polarization will be either one of two perpendicular directions (as indicated by the arrows 28*a* and 28*b*) with the direction being dependent upon the direction of circular polarization of the beam before entering the wave plate. The beam 28 thereafter is passed into an analyzer 24 such as a dichroic polarizer which is polarized to transmit only a beam having a linearly polarized state selected from the two directions possible as indicated by the arrows 28*a* and 28*b*. As shown in FIG. 1, the beam 28 will pass through the analyzer and strike the photoelectric transducer 25. However, if the beam is polarized as indicated by the arrow 28*b*, it will not pass through this polarizer and be either reflected or absorbed. Thus, the photoelectric transducer 25 will either detect a light beam or not, depending upon the phase of the beam entering the analyzer, which phase is determined by the original magnetic alignment of the discrete area 13** of the memory element through which the beam is passing, to indicate by a signal generated by the transducer the type of bit information stored on the memory element.

It can be seen that in detecting the phase of the light by sensing the absence or presence of a light signal passing through the components of the detector to the photoelectric transducer, the average light component is eliminated and the signal-to-noise ratio of the readout signal generated by the transducer is greatly increased to provide an efficient detector. It should be realized that the components can be arranged in another order and yet render the same beneficial results. For instance, one embodiment (not shown) might involve the positioning of the compensator between the light source and the memory element, followed thereafter by the quarter wave plate and the analyzer. Such a detector also is phase sensitive in the same manner as the previously described embodiment.

While the invention has been particularly shown and described with reference to a preferred embodiment thereof, it will be understood by those skilled in the art that various changes in form and details may be made therein without departing from the spirit and scope of the invention.

What is claimed is:

1. A detector for sensing the change effected on a beam of plane polarized light by passage through a magnetizable element, said detector comprising:

a compensator for absorbing a portion of that component of the light not absorbed by the element, a linear retarder for changing circular polarized light to plane polarized light, and an analyzer for detecting the polarization of said plane polarized light for indicating the magnetized state of said element.

2. A detector for sensing the change effected on a beam of plane polarized light by a magnetizable element, said detector comprising:

first means for receiving said light after passage through said element and for changing the state of said light from an elliptical to a circularly polarized state having a polarity corresponding to that of the elliptically polarized light, second means for changing the circularly polarized light received from the first means to plane polarized light having a polarity direction indicative of the direction of polarization of the circularly polarized light, and third means for generating a signal responsive to the polarity of the plane polarized light generated by the second means for indicating the change in the light beam effected by the element and therefore the magnetic state of said element.

3. A detector as defined in claim 2 wherein said first means is a dichroic polarizer.

4. A detector as defined in claim 2 wherein said second means is a linear retarder.

5. A detector as defined in claim 2 wherein said third means includes an analyzer.

6. A detector as defined in claim 5 wherein said third means also includes a photoelectric transducer.

7. A detector as defined in claim 2 wherein said first means is a dichroic polarizer, said second means is a linear retarder and said third means includes an analyzer and a photoelectric transducer.

References Cited

UNITED STATES PATENTS 3,155,944 3/1964 Oberg et al. ---------- 340—174

OTHER REFERENCES

Introduction to Atomic Physic & Nuclear Physics by Semat, 1939, pp. 122–123.

Holt, Rinehart & Winston: New York, N.Y. Polarized Light by Shurcliff, 1962, p. 87, Harvard University Press, Cambridge, Mass.

RALPH G. NILSON, Primary Examiner

M. ABRAMSON, Assistant Examiner

U.S. Cl. X.R.

250—225, 151, 157; 340—174